Patented May 16, 1950

2,507,827

UNITED STATES PATENT OFFICE 2,507,827

FILTERING MATERIAL

Earl Stafford, North Reading, and Horace N. Lee, Melrose, Mass., assignors to Arthur D. Little, Inc., Cambridge, Mass., a corporation of Massachusetts No Drawing. Application January 27, 1944,
Serial No. 519,944

13 Claims. (Cl. 183—44)

This invention relates to the production of sheets or structures for the filtering of gases or vapors to remove suspended particles of solids and liquids such as smoke particles, fogs, or other contaminants.

Such filtering structures, particularly in connection with uses such as in gas mask canisters, should combine effective filtering power with easy permeability to the gases and vapors, and adequate strength for the purposes to which they are put. Asbestos fibers of extremely fine diameter, and similarly fine-diameter mineral fibers such as mineral wool and glass wool, are well adapted for the removal of solid and liquid contaminants from gases and vapors, but they are unsuited for use alone in making filtering structures, due to the weakness of sheets made from them, to the tendency of such sheets to clog rapidly with an accumulation of the contaminants upon and between the individual fibers, and to the relatively unsatisfactory permeability of such sheets.

It is a principal object of this invention to provide filtering sheets or mats or structures of fibrous material, comprising mineral fibers of very fine diameter associated with organic fibers of suitable characteristics, in such a manner as to provide highly effective filtering out of contaminants while also providing ready permeability to gases and vapors, and also adequate strength for the purposes to which these sheets, mats or structures are commonly put.

Other objects will be evident from the following disclosure.

These objects are attained by preparing the filtering sheets or structures from a mixture or combination of three principal and essential constituents, (1) mineral or inorganic fibers capable of removing the contaminants, (2) relatively short, substantially unhydrated organic fibers which serve to separate the individual mineral fibers and to give excellent permeability, and (3) organic fibrous reinforcement, either in the form of relatively long organic fibers, or in the form of a thin, open-mesh, textile gauze adhesively united to the sheet, either form being so applied and used as to be substantially without effect upon the flow of gases or vapors through the sheet. In many instances, both forms of reinforcement may be used to advantage.

In the practical application of this invention, the intent has been to make a sheet in the form of an open, resilient, porous mat of relatively short, substantially unhydrated organic fibers which in turn form the support for an aggregation of much smaller diameter asbestos fibers, uniformly distributed throughout the mat. The degree of effectiveness—i. e. the percentage of finely divided so-called smoke, consisting of liquid and/or solid particles, which such a filter mat will remove—depends upon the thickness of the mat and the percentage or amount of fine asbestos that it contains. The efficiency of the filter depends upon the percentage of smoke removed as compared to the resistance to breathing or to the passage of air or gas through it.

Practical considerations govern the thickness of the individual sheet which may be made on a paper machine. Thus, if the sheet is much below 10 thousandths of an inch thick, it is inclined to be excessively weak and to contain pin holes. If an attempt is made to form it much over 50 thousandths of an inch thick, it is inclined to be irregular in formation and is difficult to handle on a paper machine wire. We have found that the range of thicknesses between 15 thousandths and 40 thousandths is the most practical.

The effectiveness of a given thickness of mat for meeting a given screening or filtering specification as suggested above, depends upon the percentage of asbestos used. A thickness up to 40 or more thousandths can be produced all in one sheet or from the proper number of thinner sheets superimposed as multiple layers. We have found in one case that six sheets, each of about 15 thousandths thickness and made from a furnish containing about 4 per cent asbestos, will give the same effectiveness as one sheet about 40 thousandths of an inch thick made from a furnish containing 9 to 12 per cent of asbestos, the sheets being otherwise the same.

In any case, the percentage of asbestos used is governed by the type of asbestos, i. e. its mineralogical characteristics, and by the degree of fineness of fiber size to which it is reduced in preparation for use in a filter. Also, in taking one type, the percentage required will vary somewhat because asbestos in any one commercial deposit will vary with its location in that deposit. Many types of asbestos may be used; some are better than others. Some will give a better porosity condition with the same effectiveness of smoke screening than others, because of the way they form or group themselves as dispersed in a sheet. In using the so-called "blue" asbestos from South Africa, we find that the same effect can be obtained as by using about double the amount of a blue asbestos of somewhat similar appearance from South America. Chrysotile asbestos from Quebec will give the same effectiveness of screening when used in less quantity than that required for either of the other two mentioned, but its use is usually accompanied by poorer porosity, i. e., greater resistance to breathing or to the passage of air. A combination of two kinds of asbestos sometimes gives equally as good or better results than one alone.

Our invention, therefore, comprises the use of certain types of organic fibers, described in more detail below, in proportions which will give the proper strength characteristics and the proper physical structure of the sheet to provide a framework through which a required amount of asbestos fibers can be properly supported and distributed by processes of wet formation as in paper making.

The relatively short, substantially unhydrated organic fibers may be cotton, rayon, or other natural or synthetic fibers capable of giving a soft porous sheet. In ordinary practice, such fibers are shortened by refining processes (beating and jordaning) while in suspension with water, but this results in hydration which, while making a stronger sheet, gives low air permeability. One of the important aspects of the present invention is the cutting or preparing of these fibers while they are in a dry state in order to get the proper length without hydration.

Since rayon, cotton, and in fact most organic fibers, are normally too long to give satisfactory formation, it is accordingly necessary to have them pre-cut before they are wetted. In the case of rayon, we have found that if the fibers are cut to a length ranging from about 1 mm. up to about 3 mm., they will work satisfactorily. In the case of cotton, we have found that if it is cut or shortened to the condition of a mixture ranging from what is practically dust up to about 5 mm., with the greater portion between 1 and 2 mm., it will also work satisfactorily.

Various kinds of rayon or synthetic organic fibers can be used for this purpose. We prefer to use a viscose fiber of small diameter, in either grade, dull or bright, and have generally used what is known in the trade as a one and one-half denier filament which has been cut to a length of about 3 mm.

Cotton fibers of various grades can be used. We prefer to use a purified cotton or what is known as a dissolving cotton.

In general, therefore, the length of these relatively short, substantially unhydrated organic fibers is not greater than about 5 mm., and ranges downwardly to about ½ mm. or even less. The major part of these fibers, and preferably substantially all of them, should not exceed about 3 mm. in length. It is, of course, obvious that in practice it is impossible to assure that every fiber is below about 3 mm. in length, although it is perfectly possible to provide a fiber furnish answering the requirements given above. The same situation should be borne in mind with respect to other fiber dimensions herein set forth.

The relatively long organic fibers which serve to reinforce the sheets are used in relatively smaller amounts than the short organic fibers described above, since these long fibers are of little or no value in providing porosity in the sheet. Also, since hydration of fibers tends to decrease porosity or permeability, these relatively long fibers should be hydrated as little as possible. Furthermore, a large proportion of long fibers interferes with the proper formation of the sheet. The precentage to be used is determined by the strength of the sheet required, as well as by other considerations just indicated. Substantially all of these long fibers should be at least 5 mm. in length; a good working range is 5 to 8 mm., although the actual lengths used will depend upon the kind of fiber, the quantities used, and the characteristics desired in the paper-making step and in the product.

A formula or furnish (with respect to the organic fibers only) which we have found to be satisfactory is as follows: 5% caroa fiber; 47.5% pre-cut viscose fiber; 47.5% pre-cut purified cotton. In place of caroa, we have used other long reinforcing fibers such as Manila hemp, rag fibers, and kraft, in substantially the same proportions.

This is not, however, to be taken as limiting, but merely as an example. Satisfactory filters can be made using the foregoing formula but with the pre-cut short fiber being entirely viscose or entirely cotton. Sheets made of viscose rayon are very weak; the addition of cotton slightly improves the strength without unduly interfering with the resulting air permeability. Cotton alone is satisfactory except where the highest degree of permeability is required. Long fibers, when used in more than a very small percentage, adversely affect the permeability. Where relatively strong papers are required and where necessity for strength outweighs the necessity for the lowest possible permeability, we have used proportions as high as 30 parts (by weight) of the long reinforcing fibers to 70 parts of the short organic fibers. On the other hand, it is possible to use effectively as little as about 2 parts of the long fibers to 98 parts of the short fibers. For most practical purposes, however, a satisfactory range is between about 3 parts and 10 parts of the long fibers to between about 97 parts and 90 parts, respectively, of the short fibers.

Another effect of the long fibers is to tie in the shorter fibers and thus reduce the tendency of the final product to scuff or peel in use.

Production of the highest degree of permeability requires that there shall be a minimum of mechanical action on the fibers while in water suspension. We therefore, as already stated, use dry, pre-cut, substantially unhydrated fibers for the bulk of the furnish and omit the usual refining, which is ordinarily done by beating or jordaning. These pre-cut fibers together with the other fibrous ingredients are furnished to the paper mill mixing equipment in the usual way, with water, but without any hydration whatever, or at least substantially none. When using a beater we prefer, in order to secure perfect mixing, to give a very light brushing treatment for about 5 minutes, but to use no jordan whatever.

Papers thus prepared can by themselves be used for filters or can be subsequently treated or impregnated with other substances to increase their efficiency for such purposes. But as already stated, the highest degree of efficiency for filtering very small particles without such subsequent treatments is attained by incorporating into the organic fiber furnish, in the process of manufacture, inorganic fibers such as asbestos or fine spun glass or mineral wool fibers. These can be prepared in a much smaller diameter than rayons or natural organic fibers. It is desirable that at least the major portion, and preferably substantially all, of these inorganic fibers be about 1 micron or less in diameter. The effectiveness of these fibers as filtering means increases much more than arithmetically with decreases in diameter. Various kinds of asbestos, such as Chrysotile or Amphibole, are readily subdivided into fibers of the desired diameter. We generally prefer to use the "blue" asbestos from South America or South Africa. This can be subdivided into fibers of the proper small diameter by either dry or wet processes. For convenience, we prefer the wet method and find that such a process can be carried out satisfactorily in the paper mill beater.

We have made papers containing up to 40% of inorganic (mineral) fiber and find that with the increase in percentage, the effectiveness in filtering power of a sheet of specified thickness increases accordingly. For instance, in the formulas for cellulosic fibers given above, we find that an addition of up to 15%, or even in some cases up to 40% of asbestos, depending upon the kind which is used, gives efficient filtration. Higher amounts of asbestos or mineral fiber causes too much trouble from clotting of the fibrous mixture while forming the sheets. Relatively small amounts of asbestos—even 2% or less of the total fiber—show effective improvement in filtering power of the sheets, but if too little asbestos is used, the number of sheets required for efficient filtering is generally too great for convenient use. About 3% to 15% of asbestos or mineral fiber, based on total fiber content of the sheet by weight, is a good working range. If more than about 15% of mineral fiber is used, the contaminants of the gases will in some cases clog the sheets more rapidly than is usually desired.

While the inorganic fibers ordinarily will be between about 10 and about 100 microns in length, their length is of no apparent importance for the purposes of the present invention. Their diameters are, however, important, and should be as small as possible. Diameters appreciably greater than 3 microns are of distinctly low effectiveness, and it is preferable to have diameters in the order of 1 or 2 microns, or less if possible; in any event not more than about 3 microns.

To obtain a maximum permeability, it is desirable to use the smallest amount of long organic fibers possible, i. e. only enough of such fibers to give sufficient strength to the paper during formation to permit it to carry through the paper making operation without breaking, and then to combine the resulting sheet with a coarse mesh fabric such as a gauze. In such cases, the proportion of long organic fibers is within the lower part of the range already given, for example 3 to 5% of the total content of such fiber plus short organic fibers plus mineral fibers. On the other hand, when no gauze backing is used the amount of long fibers, other conditions being equal, is advantageously around 15 to 30% on the same basis. Without reinforcement in the form of fibers or gauze or both, the final dry sheet of asbestos and short organic fibers is too weak to be handled conveniently without breaking or tearing.

We are aware that gauze or fabric backing is often used to impart stiffness, strength or other qualities to various types of paper for industrial uses, but heretofore the fabric has been applied only in a secondary operation. We have found that if the gauze is prepared with a suitable adhesive and is brought into contact with the wet sheet of paper while the latter is being made on the paper machine, we can get a satisfactory bond between the two. The point of application of the fabric to the paper is governed by the moisture in the sheet. This point lies between a place on the wire where surplus water has been removed and a point on the drying cylinders where too little water is present to permit adhesion. For convenience, a preferred point is at the first drying cylinder of the paper machine. By mounting a roll of the fabric in the proper position so it can be unwound and run onto the moving paper web under proper tension, the web and the fabric are held in close contact, which permits the adhesive in the gauze and the moisture in the paper to interact. As the paper progressively dries in its passage over the heated dryers, the proper bonding of the gauze and paper is obtained.

The adhesive must be such as not to form a layer over the paper, or otherwise to block appreciably the passage of gases or vapors through the structure. It is desirable for best results to use an adhesive which, though water-sensitive, does not readily disperse or dissolve in water and penetrate into the filter sheet or block the pores and interstices thereof. We have found that cooked or uncooked starch is entirely satisfactory for this purpose. The amount of adhesive is governed by the kind that is used, for example, we have found that a gauze sized or impregnated with 40% cooked starch or with as little as 8% uncooked starch will give good bonding without undue penetration of the adhesive. These percentages are ratios of dry starch to dry gauze.

The gauze may for example be a cheesecloth of 10 to 20 mesh, or even of coarser mesh. Too fine a mesh, e. g. much finer than 20, generally results in a structure which is rather too stiff for most purposes. The proportions by weight of fibrous reinforcement, whether as long fibers intermingled with the mineral and unhydrated organic fibers, or as gauze backing, or as both, are preferably within the ranges already stated in describing the former type (i. e. the long fibers).

At no time during the formation or drying of these filters, with or without the gauze backing, can there be anything but the very lightest possible pressure on the sheet. A prime requisite to all of these papers is that they have great bulk and any action which compresses the sheet is detrimental.

In addition to the examples already given, the following will serve as illustrations of the present invention without, however, limiting the scope thereof as set forth in the appended claims. Parts by weight, dry basis.

A sheet composed of about 5% of long fibers, e. g. caroa, and 95% of equal parts unhydrated cut cotton fibers and cut viscose fibers, of lengths within the ranges already set forth, plus asbestos as described below, makes an excellent mat when gauze-backed.

The amount of long fiber may be increased to 25% and that of the short unhydrated cotton and viscose decreased to 75%; a sheet thereof, with asbestos, when made about 30 thousandths thick is sufficiently strong without gauze backing, although its efficiency as a filter screen is not as good as that of the 5%–95% mixture.

Somewhat lower-cost products of almost equivalent efficiency may be made by using 5% long fibers and dividing the remaining 95% of organic fibers in the proportion of ⅔ cotton and ⅓ viscose, or, if not gauze backed, by using about 25% long fibers and dividing the remaining 75% in the proportion of ⅔ cotton and ⅓ viscose. Many other modifications have already been indicated herein.

When any of the above formulae are made into sheets, about 15 thousandths of an inch thick, they will have a given effectiveness for screening smokes if they are combined with 4% to 8% (based on total fiber weight) of asbestos (the exact amount depending on type, as already stated), and used as a plied-up layer of about 6 sheets. On the other hand, if twice as much asbestos of the same kind and characteristics is used in the same thickness of sheet, it will have substantially the same effectiveness and efficiency for filtering purposes if used plied-up in two layers. With the same amounts of asbestos as in the latter instance, if the sheet is made about 40 points thick it will have substantially the same effectiveness when used in a single layer.

We claim:

1. A fibrous structure adapted to filter solid and liquid particles from gases and vapors, consisting of a water-laid, interfelted fibrous sheet and a backing therefor attached thereto by means of an adhesive, said sheet consisting of a substantially uncompacted and homogeneous mixture of mineral fibers, short organic fibers and long organic fibers, the relative weight ratios between said short and said long fibers being between 70 to 30 respectively and 98 to 2 respectively, said organic fibers being substantially unhydrated, substantially all of said short fibers being less than about 3 millimeters in length and substantially all of said long fibers being greater than 5 millimeters in length, said mineral fibers being present in an amount equal to between about 2% and about 40% of the total fiber content, substantially all of said mineral fibers having diameters of less than about 3 microns, said backing consisting of an open-mesh textile fabric, said sheet and said backing being united by means of said adhesive, said structure having substantially the same degree of permeability as that of the sheet component thereof alone.

2. A fibrous structure adapted to filter solid and liquid particles from gases and vapors, consisting of a substantially uncompacted, water-laid, interfelted fibrous sheet and a backing therefor attached thereto by means of an adhesive, said sheet consisting of a homogeneous mixture of asbestos fibers having diameters of less than about one micron and substantially unhydrated organic fibers, said organic fibers consisting of between 90 and 98% by weight short fibers of less than about 3 millimeters in length and the balance long fibers of 5 to 8 millimeters in length, said asbestos fibers being present in an amount between about 2% and about 40% of the total fiber content, said backing consisting of an open-mesh textile fabric, said sheet and said backing being united by means of said adhesive, said structure having substantially the same degree of permeability as that of the sheet component thereof alone.

3. A fibrous structure in accordance with claim 2, wherein at least 50% of said short organic fibers are viscose fibers.

4. A fibrous structure in accordance with claim 2, wherein at least 50% of said short organic fibers are cotton fibers.

5. A fibrous structure in accordance with claim 2, wherein at least 50% of said short organic fibers are viscose fibers and the rest are cotton fibers.

6. A fibrous structure in accordance with claim 2, wherein at least 50% of said short organic fibers are cotton fibers and the rest are viscose fibers.

7. A paper-like structure adapted to filter solid and liquid particles from gases and vapors composed of a mass of cellulose fibers predominantly a few millimeters in length, homogeneously mixed with a comparatively small quantity of mineral fibers of diameters less than about three microns and formed into a sheet which is fifty one-thousandths of an inch or less in thickness.

8. A paper-like structure adapted to filter solid and liquid particles from gases and vapors composed predominantly of a mass of cellulose fibers of lengths not less than about one millimeter and not greater than about eight millimeters, and with a substantially greater proportion of the fibers of the mass selected from shorter lengths within that range, the remaining substantially smaller proportion being selected from the longer lengths within that range, and a small quantity of mineral fibers of diameters less than about three microns homogeneously mixed with the mass of cellulose fibers, the fibers being formed into a sheet which is fifty one-thousandths of an inch or less in thickness.

9. A structure in accordance with claim 7 wherein said mineral fibers are asbestos.

10. A structure in accordance with claim 8 wherein said mineral fibers are asbestos.

11. A structure in accordance with claim 8 wherein said cellulose fibers are substantially unhydrated.

12. A paper-like structure adapted to filter solid and liquid particles from gases and vapors composed of a mass of cellulose fibers predominantly a few millimeters in length, homogeneously mixed with a comparatively small quantity of mineral fibers of diameters less than about three microns and formed into a sheet which is fifty one-thousandths of an inch or less in thickness, said sheet being provided with a supporting backing adhesively united thereto, said backing consisting of an open-mesh textile fabric freely penetrable by said gases and vapors, the adhesive uniting said sheet and said fabric being substantially without effect upon the flow of said gases and vapors through said structure.

13. A paper-like structure adapted to filter solid and liquid particles from gases and vapors composed predominantly of a mass of cellulose fibers of lengths not less than about one millimeter and not greater than about eight millimeters, and with a substantially greater proportion of the fibers of the mass selected from shorter lengths within that range, the remaining substantially smaller proportion being selected from the longer lengths within that range, and a small quantity of mineral fibers of diameters less than about three microns homogeneously mixed with the mass of cellulose fibers, the fibers being formed into a sheet which is fifty one-thousands of an inch or less in thickness, said sheet being provided with a supporting backing adhesively united thereto, said backing consisting of an open-mesh textile fabric freely penetrable by said gases and vapors, the adhesive uniting said sheet and said fabric being substantially without effect upon the flow of said gases and vapors through said structure.

EARL STAFFORD.
HORACE N. LEE.

REFERENCES CITED

The following references are of record in the file of this patent:

UNITED STATES PATENTS

| Number | Name | Date |
|---|---|---|
| 1,368,540 | Bovard | Feb. 5, 1921 |
| 1,489,330 | Moses | Apr. 8, 1924 |
| 1,500,500 | Kaye | July 8, 1924 |
| 1,786,361 | Pahle | Dec. 23, 1930 |
| 1,786,669 | Manning | Dec. 30, 1930 |
| 1,845,444 | Sawyer | Feb. 16, 1932 |
| 1,854,414 | Milkey | Apr. 19, 1932 |
| 1,861,044 | Ballard | May 31, 1932 |
| 1,901,438 | Davidson | Mar. 14, 1933 |
| 2,078,197 | Hooker | Apr. 20, 1937 |
| 2,152,901 | Manning | Apr. 4, 1939 |

FOREIGN PATENTS

| Number | Country | Date |
|---|---|---|
| 482,137 | Great Britain | Mar. 24, 1938 |